United States Patent
Windmöller et al.

(10) Patent No.: US 10,401,089 B2
(45) Date of Patent: Sep. 3, 2019

(54) CLINKER INLET DISTRIBUTION OF A CEMENT CLINKER COOLER

(71) Applicant: Alite GmbH, Neustadt (DE)

(72) Inventors: Klaas Windmöller, Neustadt (DE); Jörg Hammerich, Neustadt (DE)

(73) Assignee: ALITE GMBH, Neustadt (DE)

( * ) Notice: Subject to any disclaimer, the term of this patent is extended or adjusted under 35 U.S.C. 154(b) by 0 days.

(21) Appl. No.: 15/842,510

(22) Filed: Dec. 14, 2017

(65) Prior Publication Data

US 2018/0142955 A1 May 24, 2018

Related U.S. Application Data

(63) Continuation of application No. PCT/EP2016/065381, filed on Jun. 30, 2016.

(30) Foreign Application Priority Data

Jul. 3, 2015 (EP) .................................. 15175305

(51) Int. Cl.
*F27D 15/02* (2006.01)
*F27B 7/38* (2006.01)
*C04B 7/48* (2006.01)

(52) U.S. Cl.
CPC .............. *F27D 15/022* (2013.01); *C04B 7/48* (2013.01); *F27B 7/38* (2013.01); *F27B 7/383* (2013.01); *F27D 15/0213* (2013.01); *F27D 2015/0226* (2013.01)

(58) Field of Classification Search
CPC ......... F23G 2203/104; F23G 2203/105; F23G 5/002; F23G 2205/10; F23H 9/04; F23H 7/08
See application file for complete search history.

(56) References Cited

U.S. PATENT DOCUMENTS

| | | | |
|---|---|---|---|
| 5,149,266 A * | 9/1992 | Heinemann | F27D 9/00 110/288 |
| 5,871,348 A * | 2/1999 | Terry | F27D 15/0213 126/163 R |
| 6,626,662 B2 | 9/2003 | Ramesohl et al. | |
| 7,798,809 B2 * | 9/2010 | Mersmann | C04B 7/47 110/281 |

(Continued)

FOREIGN PATENT DOCUMENTS

| | | |
|---|---|---|
| CN | 1784582 A | 6/2006 |
| CN | 1981174 A | 6/2007 |

(Continued)

*Primary Examiner* — Gregory A Wilson
(74) *Attorney, Agent, or Firm* — Yakov S. Sidorin; Quarles & Brady LLP (57) ABSTRACT

A clinker inlet distribution grate for feeding a conveyor grate with clinker, previously discharged from a kiln onto the clinker inlet distribution grate wherein the clinker inlet distribution grate comprises at least a chute with at least two grate elements being arranged one besides the other providing a chute enables to easily remove clinker agglomerations, so called snowmen if at least a first of said at least two grate elements is static and that at least a second of said at least two grate elements is movable orthogonally to the cross direction of the chute.

20 Claims, 9 Drawing Sheets

(56) References Cited

U.S. PATENT DOCUMENTS

| | | | |
|---|---|---|---|
| 8,894,410 B2* | 11/2014 | Cedergaard | C04B 7/47 |
| | | | 110/270 |
| 9,157,632 B2* | 10/2015 | Stiefel | F23H 3/02 |
| 9,513,058 B2* | 12/2016 | Hammerich | F27D 15/022 |
| 9,605,902 B2* | 3/2017 | von Wedel | F27D 15/022 |
| 9,845,951 B2* | 12/2017 | Bachmann | F23H 7/08 |
| 2014/0338575 A1* | 11/2014 | Kobayashi | F23G 5/24 |
| | | | 110/230 |
| 2018/0142955 A1* | 5/2018 | Windmoller | F27D 15/022 |

FOREIGN PATENT DOCUMENTS

| | | |
|---|---|---|
| CN | 101490492 A | 7/2009 |
| DE | 1108606 B | 6/1961 |
| DE | 2532026 A1 | 2/1976 |
| DE | 19649921 A | 6/1998 |
| DE | 19858767 A1 | 3/2000 |
| DE | 102006037765 A1 | 2/2008 |
| DE | 102014100378 B3 | 4/2015 |
| EP | 0129657 A2 | 1/1985 |
| EP | 0826940 a1 | 3/1998 |
| EP | 1475594 A1 | 11/2004 |
| EP | 1992897 A1 | 11/2008 |
| EP | 2645034 A1 | 10/2013 |
| EP | 3112786 A1 | 1/2017 |
| WO | 9614549 A1 | 5/1996 |
| WO | 9616306 A1 | 5/1996 |

* cited by examiner

CLINKER INLET DISTRIBUTION OF A CEMENT CLINKER COOLER

CROSS-REFERENCE TO RELATED APPLICATIONS

This application is a continuation of pending International Application No. PCT/EP2016/065381 filed on Jun. 30, 2016, which designates the United States and claims priority from European Patent EP 3 112 786 granted on the European Patent Application No. 15175305.0 filed on Jul. 3, 2015. The disclosure of each of the above identified patent documents is incorporated herein by reference

BACKGROUND OF THE INVENTION

1. Field of the Invention

The invention relates to an inlet distribution system of a cement clinker cooler.

2. Description of Relevant Art

Cement clinker, briefly referred to as 'clinker', is formed by burning raw meal in a rotary kiln at about 1450° C. The hot clinker is discharged from the kiln to a clinker cooler, briefly referred to as 'cooler', to provide a layer of clinker, the so called 'clinker bed' on a cooling grate. These coolers are very important in modern clinker production for recuperation of thermal energy. To this end a cooling gas is injected via grate openings of the cooling grate into the hot clinker bed residing on such cooling grate. Thereby, the cooling gas is heated and the clinker in turn is cooled down. The heated cooling gas is withdrawn above the clinker bed and the heat of the cooling gas can be used as process heat. In most cases, at least a part of the cooling gas is simply air and used as heated secondary air being provided to the kiln. A further part of the heated air is often drawn off at the kiln hood via a tertiary air duct and provided to a calciner. Beyond that, the heat can be used to at least one of driving a turbine process and pre-warming raw meal and drying raw meal. This state of the art is documented e.g. by DE 2532026 A, DE 10 2014 100 378 A or U.S. Pat. No. 6,626,662 B2, to name only a few.

The cooling grates of clinker coolers typically have two sections, a first section which is the so called clinker inlet distribution grate (briefly 'clinker inlet distribution') and a second section, that is a conveyor grate. Examples of conveyor grates are disclosed e.g. in WO96/16306 A1 and EP 1 992 897 A1 or DE 10 2006 037 765 A1. These conveyor grates have in common that they have reciprocating elements for conveying the clinker bed in a conveying direction to a clinker outlet and that they have grate openings for injecting air into the clinker bed. For example EP 1 475 594 suggests a clinker cooler with clinker inlet distribution chute of static grate tiles. From this chute, the clinker is unloaded to a conveyor floor of reciprocating planks extending in the direction of transport and being arranged one besides of the other with sealed moving gaps in between. Conveying takes place according to the moving floor principle.

The clinker inlet distribution is usually positioned at the clinker inlet of the cooler, i.e. just below the kiln's clinker release opening. The clinker is thus discharged to the clinker inlet distribution. These clinker inlet distributions have an inclined surface providing a chute for feeding the conveyor grate. The chute has at least two functions, namely to cool the clinker by injecting air into the clinker bed sliding down the chute and to evenly feed the conveyor grate. The object of feeding the conveyor grate is to provide a clinker bed of at least almost constant height and preferably uniform clinker grain distribution on said conveyor grate.

The chute mostly consists of a static stepped grating, wherein the rows, or more precisely the surfaces of the 'steps' are inclined to obtain a gravity induced sliding of the clinker down the clinker inlet distribution. The clinker is discharged from the lower end of the chute by the conveyor grate. If the clinker is very hot and fine-grained, the clinker tends to agglomerate on these clinker inlet distributions. In this case the clinker piles up and clogging may occur. Piled clinker is commonly referred to as a 'snowman'. To remove snowmen the clinker line has in the worst case to be shut down. However, this is extremely expensive. To resolve clogging without stopping the clinker production it has been suggested in U.S. Pat. No. 5,871,348 to install air nozzles, so called 'air cannons' besides the stepped grate. Via these nozzles a large amount of previously compressed air can be injected abruptly into the cooler to 'shoot the snowman', i.e. to literally blow the clogging clinker off the step. A further suggestion is to arrange air nozzles (i.e. air cannons) in the wall between the clinker inlet distribution and the kiln. In practice air cannons are repetitively activated in constant intervals, which are typically about 5-15 min. The disadvantage of using air cannons to resolve clogging is that bursts of air are introduced into the cooler and that the distances from the air cannons to the snowmen are often too big to resolve clogging issues reliably. Beyond that, pressurizing large amounts of air for repetitive activation of the air cannons requires high installation costs e.g. for the accordingly sized compressors and air tanks. Further, energy costs for operation of the compressors are significant.

DE 1108606 A1 suggests a clinker inlet distribution with a chute for receiving the clinker and for feeding the clinker to a conveyer grate. A retainer stone is movably supported on the chute's sliding surface to enable a transverse movement (relative to the chute's longitudinal direction) of the retainer stone. By moving the retainer stone, the clinker can be discharged as clinker bed with a constant height onto a subsequent conveyor belt for further cooling the clinker. Additionally, cooling air is injected parallel to the chute's conveying direction to thereby enhance gravity induced transport of the clinker and to avoid that clinker being retained by the retainer stone agglomerates.

EP 1 475 594 discloses a clinker cooler having a clinker inlet distribution chute. The clinker is unloaded from a kiln on the chute and slides down onto a conveyor grate of the moving floor type.

SUMMARY

The problem to be solved by embodiments of the invention is to provide a cheap and reliable clinker inlet distribution resolving clogging issues.

Hereinafter we will use the wording "and/or" to express an inclusive "or".

According to the idea of the invention, the clinker inlet distribution may be used for cooling clinker being discharged from a kiln onto said clinker inlet distribution by injecting a cooling gas via grate openings into the discharged clinker bed and for feeding the clinker to a conveyor grate. Accordingly, the clinker inlet distribution may be a part of a clinker cooler with said clinker inlet distribution and a downstream conveyor grate. The clinker inlet distribution may comprise at least a stepped grate with rows of grate elements, each having at least one grate plate with an up-facing surface for supporting clinker. The grate elements may have grate openings ('openings', for short) for blowing a cooling gas from below the grate plate to the clinker residing on the up-facing surface of the grate elements.

The stepped grate may comprise or consist of rows of grate elements, wherein the grate elements of a row are preferably arranged one beside the other. The rows' longitudinal extension is preferably at least approximately orthogonal (within angular deviation of ±25°, preferably within ±10°) to the direction of clinker transport. At least one row or preferably each row (except of the last row, i.e. the row adjacent the conveyor grate) may be positioned directly after (i.e. downstream, farther along the direction of clinker transport) and below its preceding row. 'After' refers to the direction of clinker transport, i.e. to a row that is reached subsequent (=later) to a preceding row by a particular clinker grain when moving towards the conveyor grate. Preferably, the rows are at least approximately parallel (within a range of ±5° of angular deviations, preferably within ±1°), to thereby simplify construction and assembly. Beyond that, this enhances homogeneous distribution of the clinker on a downstream conveyor grate. Summarizing, the stepped grate may resemble a staircase, wherein each row provides a single step.

Accordingly, the clinker may be discharged on the row(s) close to the clinker inlet and slide in the transport direction over the rows' and thus the grate elements' up-facing surfaces towards the conveyor grate. This sliding motion is preferably due to gravity, only. For example, the rows may be static, i.e. the rows do not reciprocate. Grate elements of each row may be mounted to a respective static cross beam, configured to support such grate elements. The up-facing surface(s) of at least one of the grate elements and thus the respective row(s) may be inclined towards the subsequent (again in the direction of clinker transport) row to enhance gravity induced transport of the clinker; the clinker may thus simply slide down the inclined up-facing surface of a (preceding) row to be thereby discharged on the subsequent row positioned after (seen in the direction of transport) and below the preceding row. In other words the front end of the inclined up-facing surface(s) is lowered with respect to the rear end of the inclined up-facing surface(s). Only to avoid misunderstandings it is mentioned that the front ends face away from the clinker inlet and thus towards the conveyor grate, i.e. in the direction of clinker transport. The conveyor grate, in contrast, typically has means for actively conveying the clinker as explained above. Stepped conveyor grates typically have reciprocating crossbars each supporting a row of grate elements.

Preferably, at least one row comprises at least one static grate element and at least one movable grate element, the latter being movable preferably at least essentially orthogonally to the longitudinal direction of the respective row. The longitudinal direction of the row is at least essentially orthogonal (with a possible deviation from one another within ±25°, preferably ±10° or less) to the conveying direction (the direction of clinker transport). The movable grate element can thus be shifted forth and back, e.g. orthogonally (with a possible deviation from one another within ±25°, preferably ±10° or less) to the longitudinal direction of the respective row. An actuator may be functionally coupled to the movable grate element for driving the movable grate element, i.e. for moving the movable grate element. The actuator may be coupled to only one movable grate element or to a group of movable grate elements for moving said one movable grate element individually or said group of movable grate elements.

A movable grate element enables to push clinker located in front of the respective grate element(s) in the direction of transport, i.e. forward and to thereby break up agglomerates and avoid the formation of snowmen. The movable grate element can as well be moved against the direction of transport, thereby destabilizing a snowman that in turn tilts and tumbles down. Neighbored movable grate elements may be shifted in opposite directions, i.e. antiparallel to each other to thereby destabilize agglomerates particularly efficient; existing snowmen are simply destabilized, tumble down and are transported by gravity towards the conveyor grate.

A central aspect of the invention is that one or more rows of grate elements comprise at least one single, so to speak isolated, movable grate element (or a grate segment like e.g. a row segment) in between of static grate elements. This is different from typical conveyor grates with reciprocating rows of grate elements. The 'normal' transportation down the chute is due to at least one of gravity and the cooling gas being injected into the clinker bed on the chute. Only agglomerations, like said snowmen, are released by moving said at least one isolated movable grate element (or grate segment, row segment) in between of said static grate elements forth and/or back, i.e. at least one of forwards and backwards. The constructional effort for movably supporting at least one movable grate element in between of static grate elements is much lower than the effort for reciprocating whole rows. In addition the energy consumption for driving only one or a few movable grate elements of a row is much lower than reciprocating a complete row of grate elements.

Particularly preferred, at least one row comprises at least three grate segments being arranged one besides of the other, wherein the grate segment between the other two grate segments is movable orthogonally to the longitudinal direction of the respective row and the grate segments to the left and to the right of the movable grate segment are static. Each of the grate segments may comprise or consist of one or more neighbored, i.e. adjacent grate elements. The static grate elements enable a simple and thus cheap connection of the clinker inlet distribution grate with refractory besides the clinker inlet distribution grate. Said refractory may define side walls of the clinker inlet system. The movable grate elements enable to destabilize clinker agglomerates like, e.g. snowmen.

Preferably, the grate element(s) in front of and/or preceding (in the direction of clinker transport) the movable grate element are/is static as well. In case the rows provide a stepped grate, the grate element(s) directly below (=in front of) and directly above (=preceding) the movable grate element are static. A movable grate element is thus preferably in between at least two static grate elements. Particularly preferred, all neighbored grate elements of a movable grate element are static. This significantly reduces manufacturing costs, as (at least one of) the static grate elements may movably support its neighbored movable grate element. Expensive bearings for reciprocating cross bars supporting complete rows of grate elements can thus be omitted.

For example, the movable grate element may be supported by at least one guide rail attached to at least one of the static grate elements in front of and/or preceding the movable grate element. Alternatively or additionally the guide rail may by attached to and thus be supported by at least one static grate element besides the movable grate element. Preferably, the movable grate element is supported by two static grate elements in between of which the movable grate element is positioned, e.g. by at least one guide rail attached to said static grate elements. The guide rail(s) may as well be integrated in or attached to the static grate elements besides the movable grate element. The movable grate element may comprise at least one linear bearing sliding and/or rolling (subsequently briefly sliding) on said guide rail. In other words, the movable grate element may be slidingly supported by at least one guide rail. Said guide rail(s) may be supported, e.g. attached to at least one static grate element and/or static cross bar. Preferably, the guide rail spans between two static grate elements. Of course the guide rail may as well be mounted to the movable grate element and the corresponding bearing(s) to the respective static grate element(s).

Preferably, the linear bearing is positioned below a grate element and not below the moving gap between a movable and a static grate element to avoid that clinker drop affects longevity of the bearing. Said moving gap is preferably sealed to avoid clinker drop. Alternatively, the moving gap can be used as nozzle for injecting cooling gas into the clinker bed, thereby avoiding clinker drop through the moving gap. Beyond wear of the gap is reduced.

Preferably, the front facing side of the movable grate element has a sliding plate sliding over the next (in the direction of clinker transport) grate element when moved forwards and/or backwards. The sliding plate seals or at least reduces the gap between the movable grate element and the static grate element in front of said movable grate element. Clinker fall through is thus reduced and the cooling gas mainly enters the clinker bed via cooling gas openings in the up-facing surfaces of the grate elements. In a similar manner, at least one further sliding plate may be attached to the front end of the preceding row to seal or at least reduce the gap between the static preceding grate element(s) and the up-facing surface of the movable grate element(s) in the row below.

As mentioned above, the movable grate element(s) may be connected to a drive for reciprocating the movable grate element. The drive may, e.g. comprise a lead screw mechanism, a crank mechanism, a hydraulic actuator and/or a pneumatic actuator for pushing the movable grate element forward and/or for retracting it backwards.

The grate elements may each comprise a support structure for supporting at least one grate plate with an up-facing surface for supporting clinker. The support structure may resemble a box, i.e. have a front wall, a rear wall and two side walls. The bottom may be at least partly open to enable a cooling gas flow into the support structure. The grate plate may comprise grate openings for injecting a cooling gas into the clinker. In case of multiple grate plates, grate openings may be provided by gaps between the grate plates of a grate element. The support structure may, preferably at its rear end, comprise a support adapter for mounting the support structure to a beam, e.g. a cross beam. The support adapter and the support structure may comprise or form a duct for guiding a cooling gas from below the support structure to the at least one grate opening.

For example, the clinker inlet distribution may comprise a support structure supporting the rows of grate elements on cross beams. Said support structure may be enclosed by or integrated in a housing. Said housing may tightly enclose the space below the grate elements to thereby provide or form a cooling gas duct for providing a cooling gas flow from a cooling gas source (e.g. ventilation means) to the grate elements and thus the grate openings. For example, the duct may be in fluid communication with a cooling gas duct of the conveyor grate.

Only to avoid ambiguities, a static row or grate element does not move relative to a base of the clinker inlet distribution. A movable grate element in contrast is movable relative to the base and thus as well relative to the static grate elements. Further, the terms 'downstream' and 'upstream' refer to the direction of flow or transport of the clinker (unless explicitly mentioned); thus, a clinker cooler is located downstream with respect to a kiln and usually upstream with respect to a clinker crusher (into which the cooler discharges the clinker). For the invention it is however only relevant that grate elements of a single row are moved relative to each other. For economic reasons it is however preferred if at least one movable grate element moves relative to at least one of its neighbored static grate element of the same row, but the invention is not intended to be limited to this embodiment.

BRIEF DESCRIPTION OF THE DRAWINGS

In the following, the invention will be described by way of example, without limitation of the general inventive concept, on examples of embodiment and with reference to the drawings.

FIG. 5 shows an example of a clinker inlet distribution with a section of a downstream conveyor grate While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION

Figure 1:
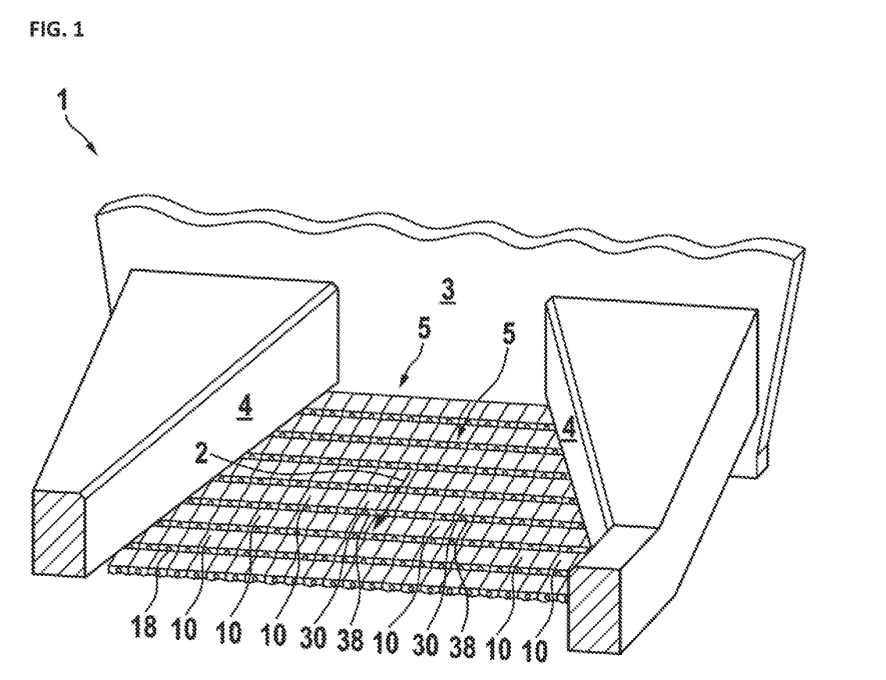
FIG. 1 shows an example of a clinker inlet distribution.

FIG. 1 shows an example of a clinker inlet distribution system 1. The clinker inlet distribution system 1 comprises a clinker inlet distribution grate, briefly referred to as clinker inlet distribution. The clinker inlet distribution comprises grate elements 10, 30 being arranged one beside another in stepped rows 5. The rear part of each row 5 is overlapped by the front part of its preceding row 5 (in the direction of transport 2), thereby forming a structure resembling a stair. Each step, i.e. row 5 may comprise or be constituted of grate elements 10, 30 arranged side by side. The clinker inlet distribution grate extends from a rear wall 3 in the conveying direction 2 to a subsequent conveyor grate. Beside the clinker inlet distribution grate are sides walls 4, e.g. of some refractory material.

The grate elements 10 are static, i.e. they are not movable. The grate elements 30, in contrast, are movable. In this preferred embodiment they are movable parallel to the grate surface of the next downstream (that is, located farther along a direction in which the clinker is conveyed) grate element. A sliding plate 18, 38 may be attached to the front end side of the grate elements 10, 30, to define the gap between overlapping grate bars. Preferably, the sliding plates are at least vertically adjustable. In the examples of FIG. 1 to FIG. 4c the sliding plates 18, 38 are simply bolted to the front ends of the grate elements. Other possibilities for attaching the sliding plates 18, 38 are possible as well, e.g. the more sophisticated method of EP 2 645 034 may be used as well. Said EP 2 645 034 is incorporated herein as if fully disclosed.

As can be seen in FIGS. 2 to 4c, each grate element 10, 30 comprises a support structure 11, 31, subsequently referred to as a carrier 11, 31, e.g. in the form of a box. The carriers 11, 31 support grate plates 12, 32 as rest for a clinker bed. At least some of the grate elements 10, 30 have at least one nozzle 13, 33 for injecting a cooling gas from below the grate plates 12, 32 into a clinker bed on top of the grate elements 10, 30. The nozzles 13, 33, e.g. slot-like cooling gas channels 13, 33, are arranged consecutively transversely to the conveying direction. In this particular embodiment, the nozzles 13, 33 are constituted by gaps between grate plates 12, 32 of grate elements 10, 30.

The grate elements 10 of the rows 5 are firmly attached to a static support structure 50 and thus as well are static and referred to as 'static grate elements 10'. The grate elements 30 in contrast, are movably supported to enable a reciprocating movement orthogonal to the longitudinal extension of the rows 5 and thus referred to as 'movable grate elements 30'. The reciprocating movement is indicated in FIG. 2 by a double headed arrow 39.

Figure 2:
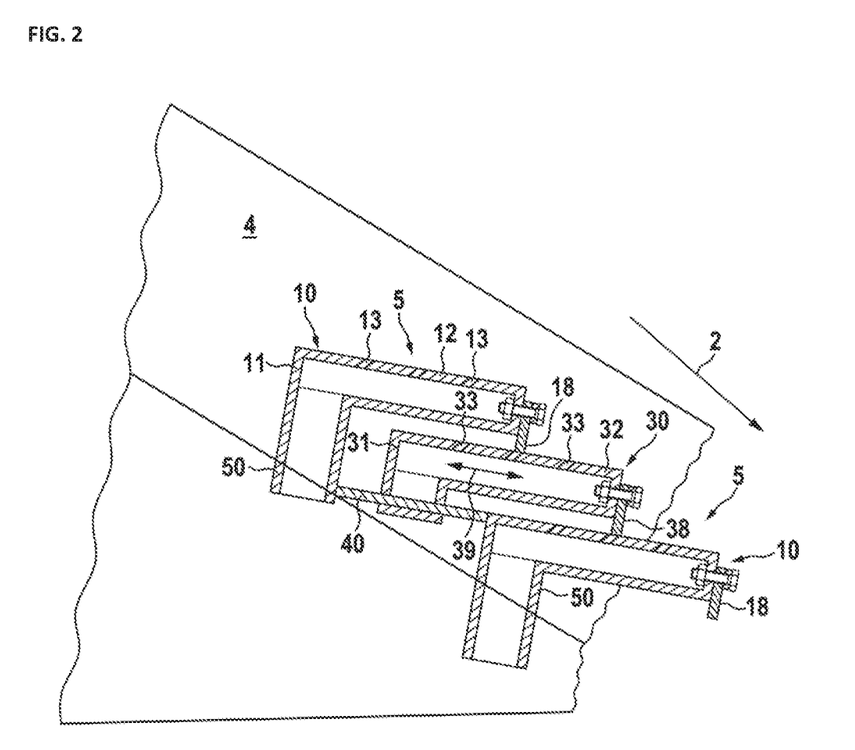
FIG. 2 shows a schematic cross section of three grate elements.

A preferred possibility for suspending a movable grate element 30 in between of two static grate elements 10 is depicted in FIG. 2: The static grate elements 10 are firmly attached to cross bars 50. The cross bars 50 are static, i.e. not movably supported, e.g. attached to the side walls of the clinker inlet distribution system 1 or to a different support system. A guide rail 40 (at least one, visible is only one) spans from a static cross bar 50 to a static grate element 10, i.e. from a first row 5 to another row 5, bridging a row 5 in between of the first and the another row 5 (only for clarity, the first row 5 can be any row 5). The guide rail 40 may as well span between two static grate elements 10 and/or two static cross bars 50. As well, the guide rail may span between at least one static grate element 10 and at least one static cross bar 50. Overall, the at least one guide rail 40 may be attached to static structures to bridge the space in between of the static structures. The movable grate element 30 in between of the two static grate elements 10 may comprise a linear bearing enabling the movable grate element 30 to move as indicated by the double headed arrow 39, i.e. parallel to the guide rail 40. A linear drive may be coupled to the movable grate element 30.

Figure 3:
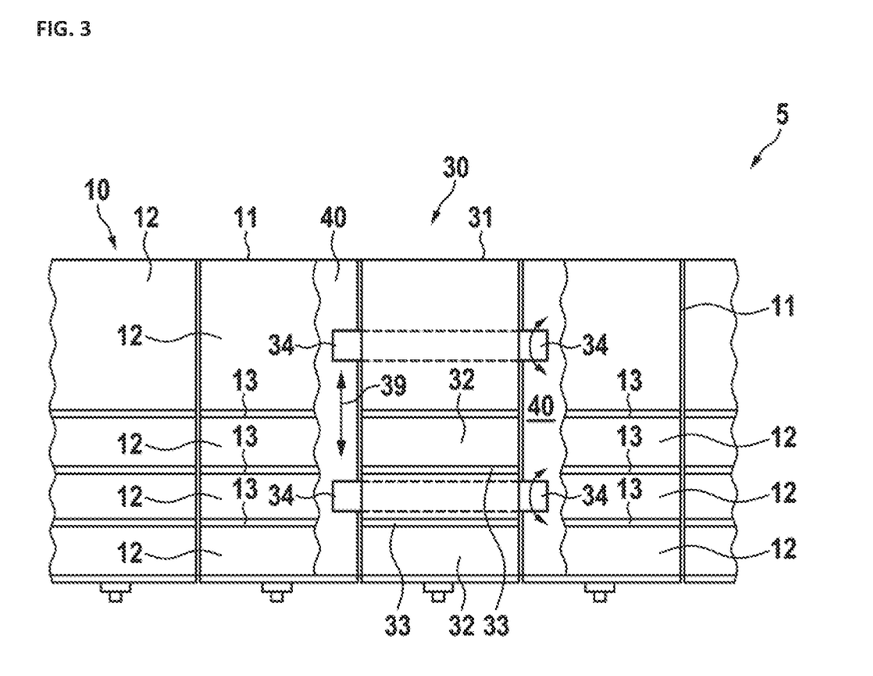
FIG. 3 shows a top view of a partially depicted row of grate elements.

A further possibility for suspending a movable grate element 30 in between of two static grate elements 10 is depicted in FIG. 3. The row 5 as shown in FIG. 3 comprises grate elements 10, 30. The fixed grate elements 10 may be mounted to a static cross bar 50 as shown in FIG. 2. In this embodiment, the movable grate element 30 may be supported by grate elements 10 of the same row 5. In other words the movable grate element 30 is positioned side by side with two static grate elements 10. The grate elements 10, 30 each have a carrier 11, 31 supporting grate plates 12, 32 with nozzles 13, 33 in between. The static grate elements 10 each have an elongate recess in their narrow sides which face the movable grate element 30 in between of them. The elongate recesses each provide a guide rail 40 supporting the movable grate element 30. Accordingly, the movable grate element 30 has protrusions or support arms 34 engaging into the recesses. When the movable grate element 30 is reciprocated as indicated by the double headed arrow 39, the protrusions slide over the respective rail 40's surface. Preferably, the protrusions or support arms 34 are equipped with rolls and/or are rotatable to reduce friction. In this case the protrusions 34 roll over the guide rail. Only as an example, the protrusions 34 on the left side (seen in the direction of transport 2 as indicated in FIG. 2) of the movable grate element 30 are rotatable. The protrusions 34 on the right side are gliders. Of course all four protrusions 34 could be sliders, gliders, rotatable or comprise a roller.

Figure 2A:
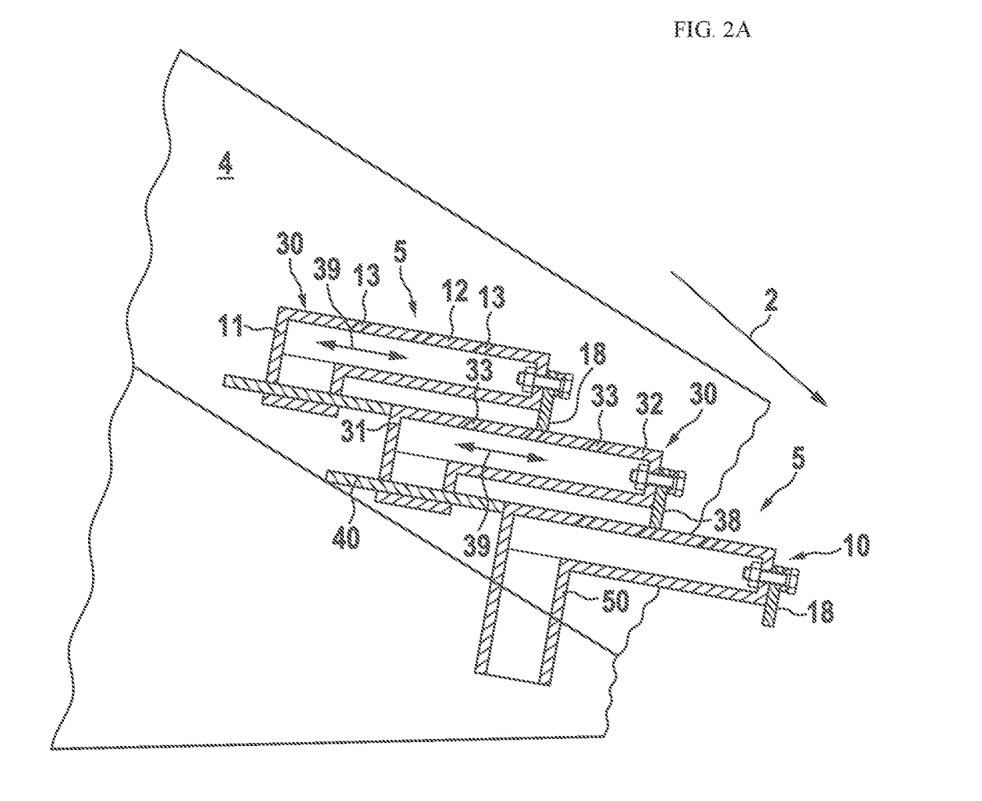
FIG. 2A shows a schematic cross section of an alternative arrangement of three grate elements.
Figure 3A:
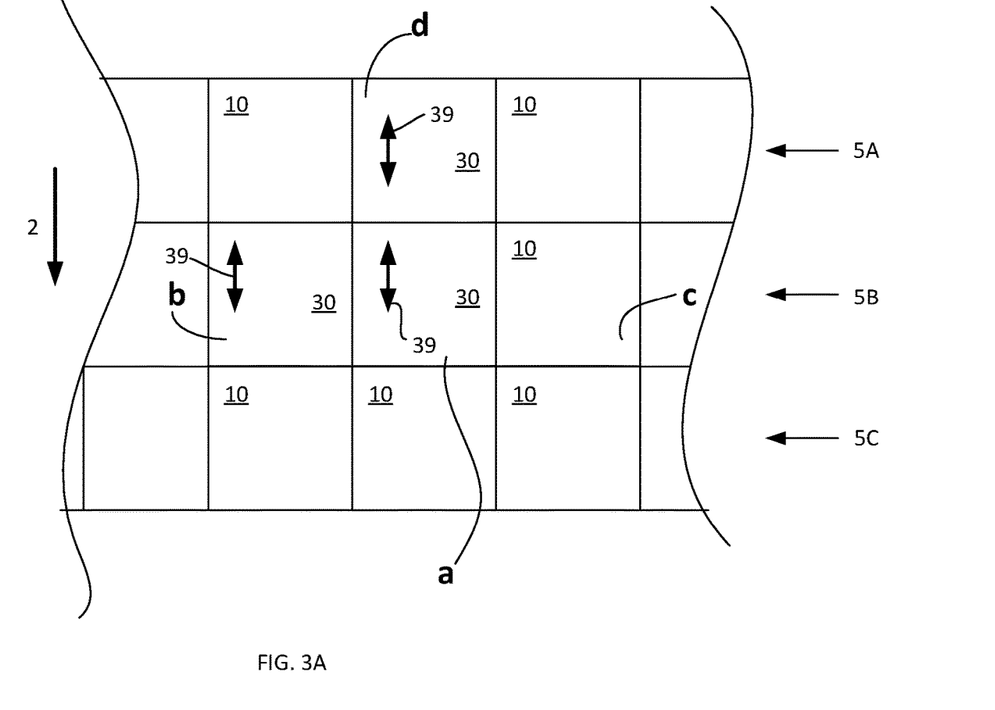
FIG. 3A is a schematic representation, in top view, of several rows of grate elements of an embodiment of the clinker inlet distribution.

An alternative and not necessarily preferred in practice arrangement of suspending a movable grate element 30 of a chosen row in between two immediately neighbouring grate elements (one of which is static and one of which is also moveable) is shown in FIG. 2A. Here, the movable grate element 30 of the middle of the three rows is shown between another movable grate element 30 of the upper row and the static grate element 10 of the lower row. Each of the moveable grate elements 30 is movably supported to enable a reciprocating movement orthogonal to the longitudinal extension of the rows of the grate elements. The simplified schematic of FIG. 3A, presenting the top view of several rows 5 of grate elements, corresponds to FIG. 2A. Here, three rows 5A, 5B, 5C are shown, and the middle row 5B of the three rows contains a moveable grate element 30 (additionally denoted as "a") and the neighboring grate elements 30,*b* and 10,*b* in the same row 5B. The neighboring grate element 30,*b* is shown to be moveable (in the same direction illustrated by the double-headed arrow 30, that is orthogonal to the longitudinal direction of this row 5B and along which the element 30,*a* is moveable), while the element 10,*c* is shown to be static. The grate element 30,*d* in the upper —of the three shown rows —row 5A The moveable element 30,a in the row 5B corresponds to the middle grate element shown in FIG. 2A, while the moveable element 30,d in the row 5A corresponds to the upper moveable grate element shown in FIG. 2A.

Figure 4A:
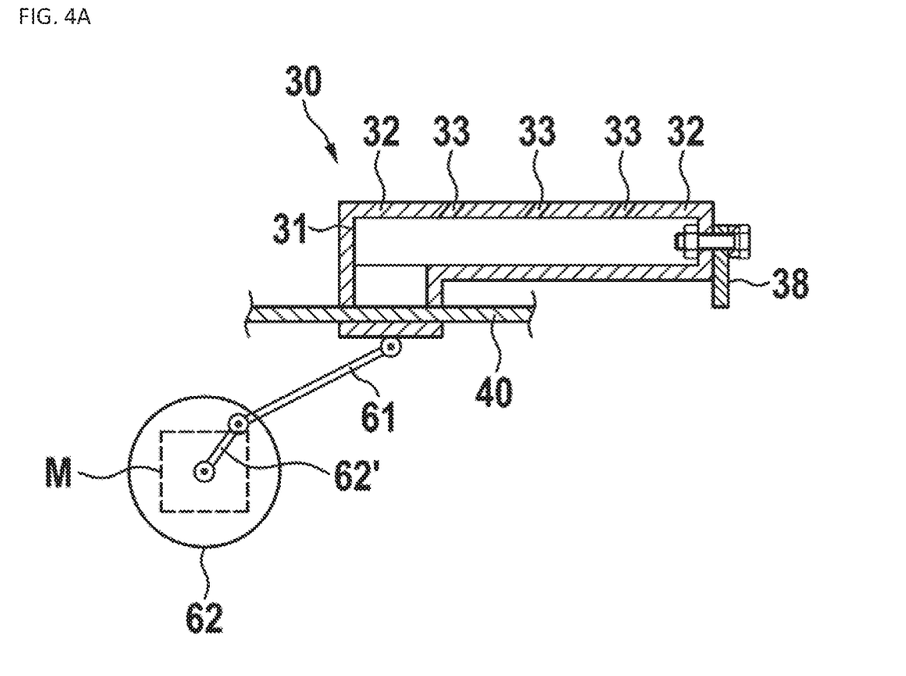
FIGS. 4A, 4B, and 4C show schematic variants for driving a movable grate element.
Figure 4B:
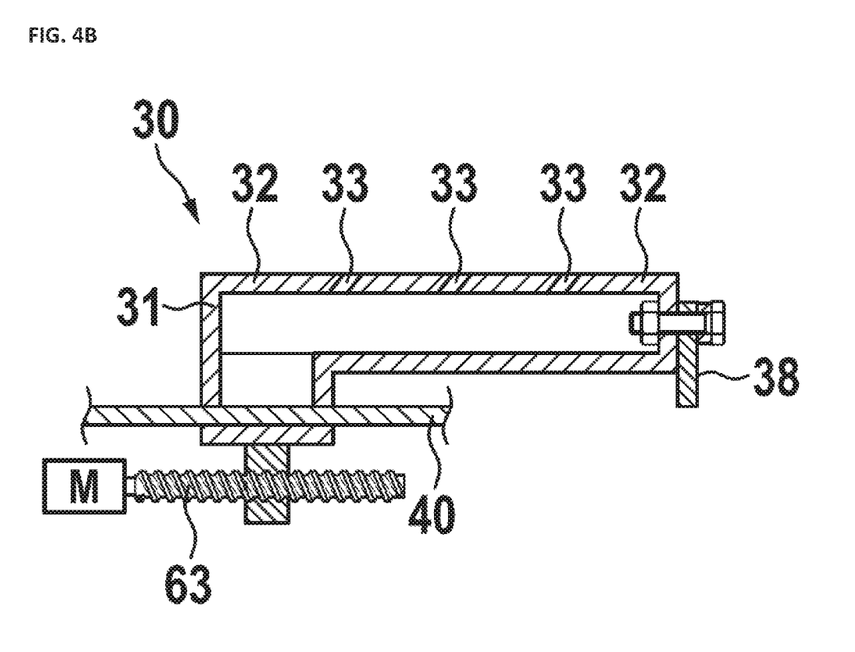
Figure 4C:
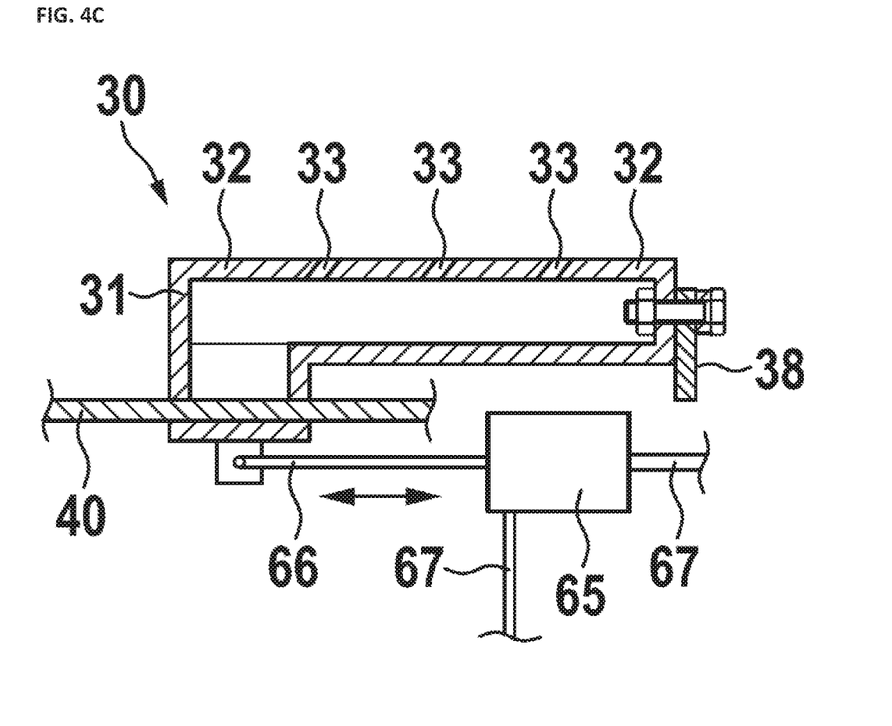

FIG. 4A shows a crank mechanism for driving a movable grate element 30. A motor M drives a crank 62' or a disk 62 that is connected by a connection bar 61 to the movable grate element 30. The movable grate element 30 is movably supported by a guide rail 40 as explained for example in more detail with respect to FIG. 2 and FIG. 3. FIG. 4B shows a similar example, but in FIG. 4B the crank mechanism was replaced by a lead screw mechanism 63. A further option is a hydraulic or pneumatic actuator 65 which may be coupled e.g. by a piston rod 66 to a movable grate element 30, as depicted in FIG. 4C. The cylinder part of the actuator 65 may be attached to any suited structure, e.g. a static cross beam 50 or a static grate element 10. Fluid lines 67 for pressurizing the piston are schematically shown.

Figure 5:
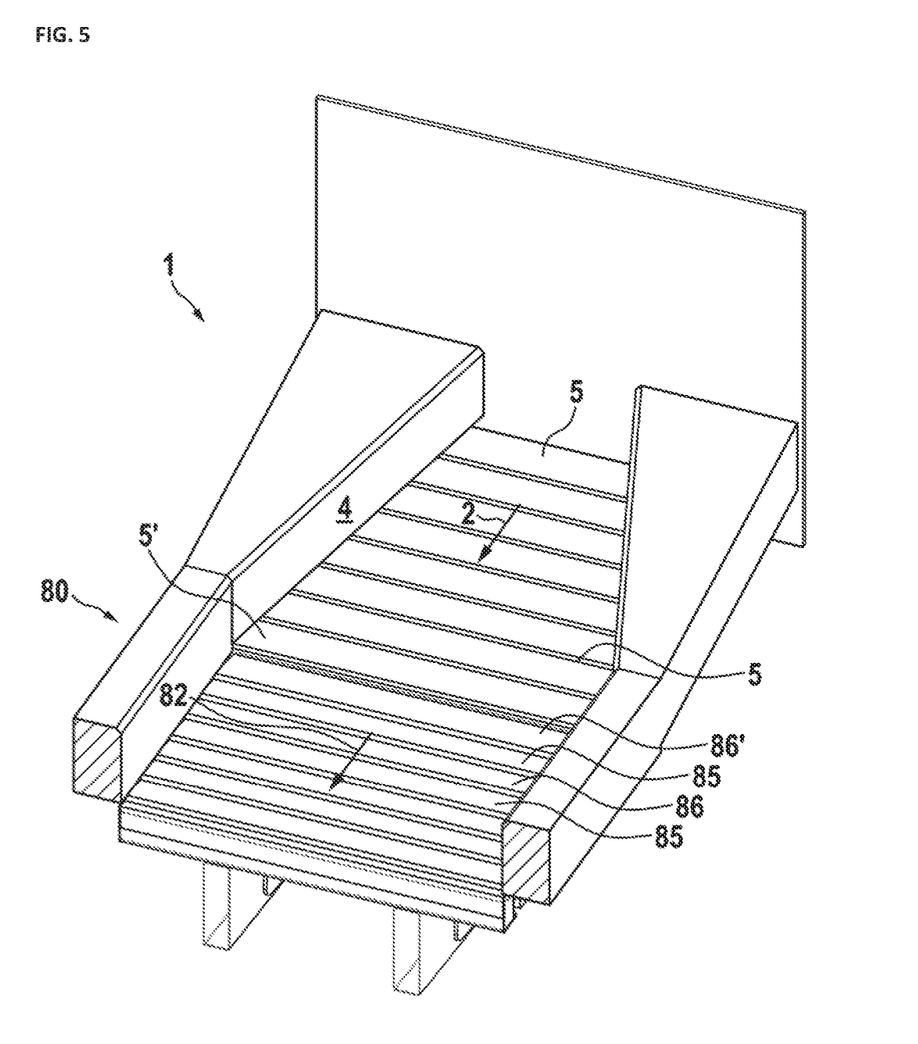

FIG. 5 shows the clinker inlet distribution system 1 of FIG. 1. The figure was slightly simplified, to better visualize the rows 5, 5'. The grate elements 10, 30 have been omitted for this purpose. Downstream from the clinker inlet distribution system 1 there is a conveyor grate 80 of a clinker cooler, configured to cool and convey clinker. As can be seen, the conveyor grate is a stepped grate where grate elements are arranged in rows 85, 86, as disclosed e.g. in WO96/16306 A1 which is enclosed by reference as if fully disclosed herein. In this example every second row 85 is movably supported and driven to reciprocate forth and back to thereby convey the clinker on top of the conveyor grate in the direction indicated by arrow 82. The rows 86 are static. In other configurations only every third or fourth row reciprocates. Briefly at least some of the rows 85, 86, 86' of the conveyor grate reciprocate and the others are static. The last row 5' of the clinker inlet distribution system 1 overlaps the conveyor grate 80, in this example its first row 86'. Thus the clinker sliding down the chute formed by the rows 5, 5' is deposited on the conveyor grate. The depicted stepped grate floor is only an example for a conveyor grate. An alternative concept of a conveyor grate is suggested in EP 1 992 897 A1, which is as well incorporated as if fully disclosed herein. Such conveyor grates have planks extending in a longitudinal direction 82 which are arranged one besides of the other. At least some of the planks reciprocate to convey the clinker according to the walking floor concept. Cooling air may be injected via moving gaps formed between the planks.

It will be appreciated to those skilled in the art having the benefit of this disclosure that this invention is believed to provide a clinker inlet distribution system and a method for operating it. Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

LIST OF REFERENCE NUMERALS

1 clinker inlet distribution system
2 conveying direction/direction of transport
3 rear wall
4 side wall
5 row
5' last row
10 static grate element
11 carrier
12 grate plate
13 nozzle/cooling gas channel
18 sliding plate
30 movable grate element
33 carrier
32 grate plate
33 nozzle/cooling gas channel
34 protrusion / support arm
38 sliding plate
39 double headed arrow indicating direction of movement
40 guide rail
50 cross bar
61 connection bar/rod
62 disc
62' crank
63 lead screw
65 linear actuator
66 piston bar
67 fluid lines
80 conveyor grate
82 arrow
85 reciprocating row of the conveyor grate
86 static row of the conveyor grate
86' first row of the conveyor grate, may be static or movable
M motor

The invention claimed is:

1. A clinker inlet distribution grate for cooling clinker being discharged via a clinker inlet from a kiln onto said clinker inlet distribution grate by injecting a cooling gas into the clinker layer, said clinker inlet distribution grate is configured to transport said clinker to a conveyor grate, the clinker inlet distribution grate comprising:
   a chute with rows of grate elements, wherein each row
      comprises grate elements being arranged one beside another, and
      has an up-facing surface configured to support the clinker,
      wherein at least one row comprises at least one static grate element and at least one movable grate element, said at least one movable grate element being movable orthogonally to a longitudinal direction of the at least one row.

2. The clinker inlet distribution grate of claim 1, wherein a grate element located directly in front of or directly behind the at least one movable grate element is a static grate element, or wherein grate elements located directly in front of and directly behind the at least one movable grate element are static grate elements.

3. The clinker inlet distribution grate of claim 1, wherein the rows extend at least approximately parallel to each other within ±5° and extend at least approximately perpendicularly within ±5° to a direction of clinker transport.

4. The clinker inlet distribution grate of claim 1, wherein at least a segment of a front edge of the up-facing surface of at least one row of grate elements is lowered with respect to a rear edge of the up-facing surface.

5. The clinker inlet distribution grate of claim 1, wherein at least one row comprises three neighbored segments, wherein each of two outer segments comprises at least one static grate element, and a segment between the two outer segments comprises the at least one movable grate element.

6. The clinker inlet distribution grate of claim 1, wherein the at least one movable grate element is supported by at least one guide rail, which is attached to or integrated in the at least one static grate element.

7. The clinker inlet distribution grate of claim 1, wherein the at least one movable grate element is supported by at least one guide rail, which is attached to or integrated in at least one static cross beam, the at least one static cross beam being configured to support the at least one static grate element .

8. The clinker inlet distribution grate of claim 1, wherein the at least one movable grate element comprises at least one guide rail that is supported by or forming part of a linear bearing, the linear bearing being attached to or integrated in at least one of (i) the at least one static grate element and (ii) at least one static cross beam configured to support the at least one static grate element.

9. The clinker inlet distribution grate of claim 1, wherein said at least one movable grate element overlaps a clinker-supporting surface of a row located downstream with respect to the at least movable grate element,
   wherein a sliding plate is mounted to said at least one movable grate element to seal a moving gap that is formed between said row, located downstream with respect to the at least one movable grate element, and said at least one movable grate element.

10. The clinker inlet distribution grate of claim 1, wherein at least one grate element located upstream with respect to the at least one movable grate element overlaps said at least one movable grate element.

11. The clinker inlet distribution grate of claim 10, further comprising a sliding plate attached to said at least one grate element located upstream with respect to the at least one movable grate element, to seal a moving gap between the at least one movable grate element and said at least one grate element.

12. The clinker inlet distribution grate of claim 1, further comprising a cross beam configured to support the at least one static element, and wherein the at least one static grate element comprises at least one of (i) a carrier, wherein such carrier supports at least one of a grate plate with an up-facing surface for supporting clinker, and (ii) a support adapter configured to attach the at least one static grate element to a cross beam.

13. The clinker inlet distribution grate of claim 1, wherein a row of the grate elements that is adjacent to the conveyer grate overlaps the conveyor grate.

14. A clinker cooler having a clinker inlet, configured to receive hot clinker, and a clinker outlet, configured to discharge cooled clinker, the clinker cooler comprising the clinker inlet distribution grate of claim 1 and a conveyor grate configured to cool clinker and to convey the clinker towards the clinker outlet.

15. A method for releasing a clinker pile on a chute, located downstream a kiln and upstream a conveyor grate that is configured to convey and cool the clinker, the method comprising:
shifting at least one movable grate element of a row, of grate elements, of the chute in at least one of forward and backward directions and approximately parallel, within ±25°, to a direction of clinker transport down the chute, said shifting being relative to at least one of grate elements located beside said movable grate element in said row.

16. The method of claim 15, wherein said shifting occurs while the at least one of the grate elements located beside said movable grate element in said row is not shifted.

17. The method of claim 15, further comprising supporting movable grate elements by grate elements of the chute that are next to the movable grate elements.

18. The method of claim 17, wherein said supporting includes supporting the movable grate element with the grate elements, of said row, of the chute that are held in place and are static.

19. A clinker inlet distribution grate for cooling clinker, that is being discharged via a clinker inlet from a kiln onto said clinker inlet distribution grate, by injecting a cooling gas into the clinker layer, said clinker inlet distribution grate configured to transport said clinker to a conveyor grate, the clinker inlet distribution grate comprising:
a chute with rows of grate elements, wherein each row
comprises grate elements being arranged one beside another, and
has an up-facing surface configured to support the clinker,
wherein at least one row, from said rows of the grate elements, comprises at least one static grate element and at least one movable grate element,
wherein said at least one movable grate element is movable orthogonally to the longitudinal direction of at least one row of the grate elements,
wherein the at least one movable grate element is supported by at least one guide rail, which is attached to or integrated in the at least one static grate element.

20. A clinker inlet distribution grate for cooling clinker, that is being discharged via a clinker inlet from a kiln onto said clinker inlet distribution grate, by injecting a cooling gas into the clinker layer, said clinker inlet distribution grate configured to transport said clinker to a conveyor grate, the clinker inlet distribution grate comprising:
a chute with rows of grate elements, wherein each row
comprises grate elements being arranged one beside another, and
has an up-facing surface configured to support the clinker,
wherein at least one row, from said rows of the grate elements, comprises at least one static grate element and at least one movable grate element,
wherein said at least one movable grate element is movable orthogonally to the longitudinal direction of at least one row of the grate elements,
and further comprising
a cross beam configured to support the at least one static element, and
wherein the at least one static grate element comprises at least one of (i) a carrier, wherein such carrier supports at least one of a grate plate with an up-facing surface for supporting clinker, and (ii) a support adapter configured to attach the at least one static grate element to a cross beam.

* * * * *